Aug. 5, 1924.

W. R. FOX

DRILLING MACHINE OILING SYSTEM

Filed March 17, 1923   2 Sheets-Sheet 2

1,504,192

Inventor:
William R. Fox,
by Spear, Middleton, Donaldson & Hall
Attys.

Patented Aug. 5, 1924.

1,504,192

UNITED STATES PATENT OFFICE.

WILLIAM R. FOX, OF JACKSON, MICHIGAN.

DRILLING-MACHINE-OILING SYSTEM.

Application filed March 17, 1923. Serial No. 625,923.

*To all whom it may concern:*

Be it known that I, WILLIAM R. FOX, a citizen of the United States, and resident of Jackson, in the county of Jackson and State of Michigan, have invented certain new and useful Improvements in a Drilling-Machine-Oiling System, of which the following is a specification.

The invention consists in the features and combination and arrangement of parts hereinafter described and particularly pointed out in the claims.

In the accompanying drawings—

Figure 1:
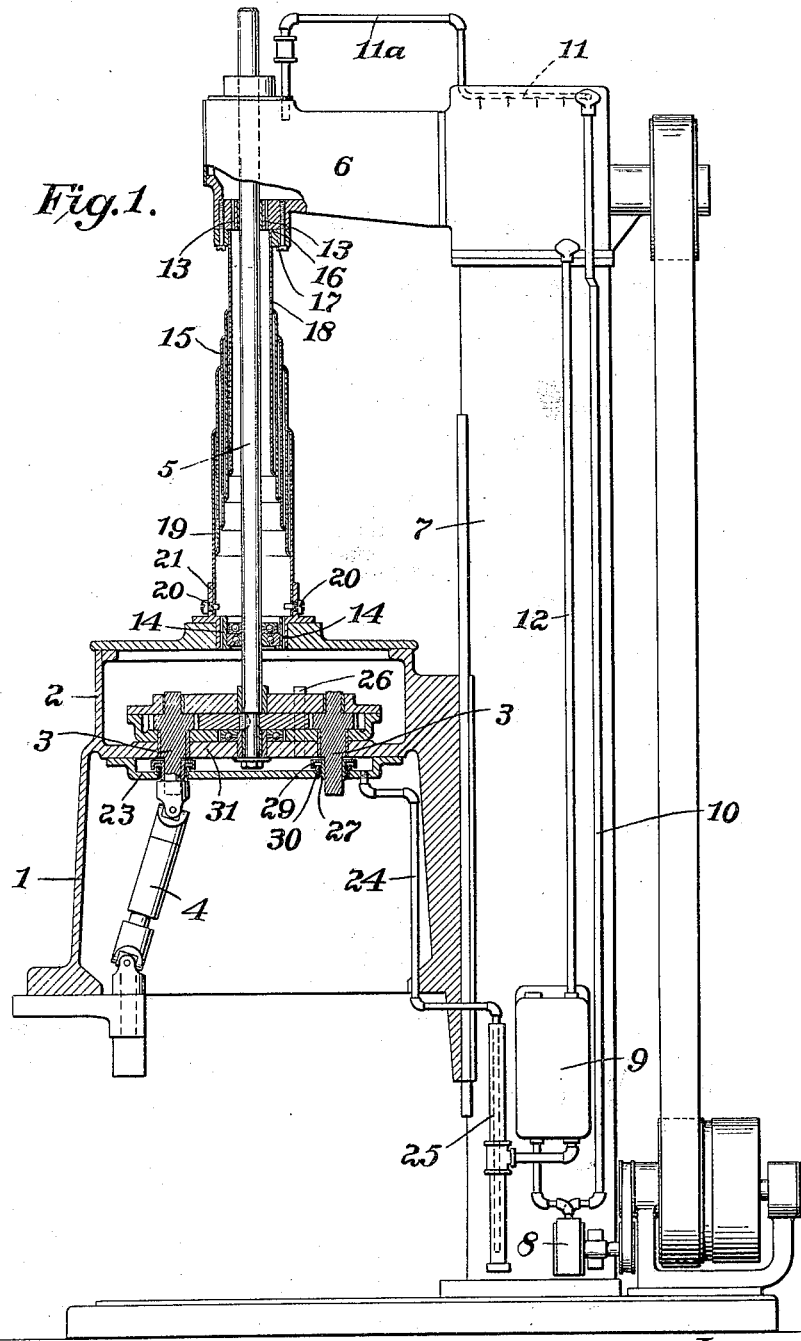
Fig. 1 is an elevation partly in section and partly in elevation of a drilling machine embodying my invention.
Figure 2:
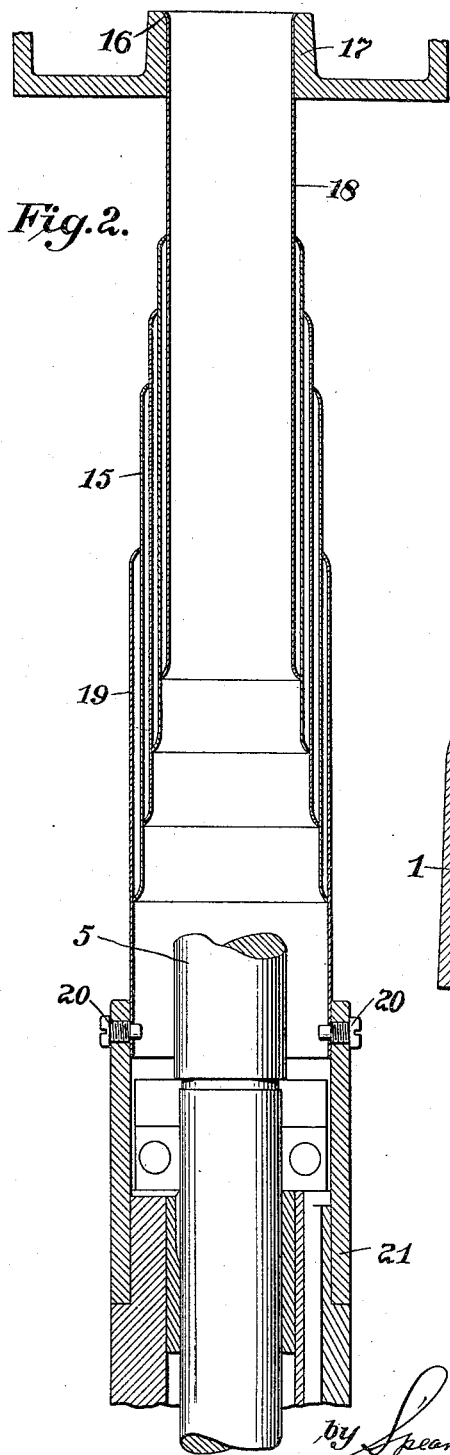
Fig. 2 is an enlarged view of parts shown in Fig. 1.
Figure 3:
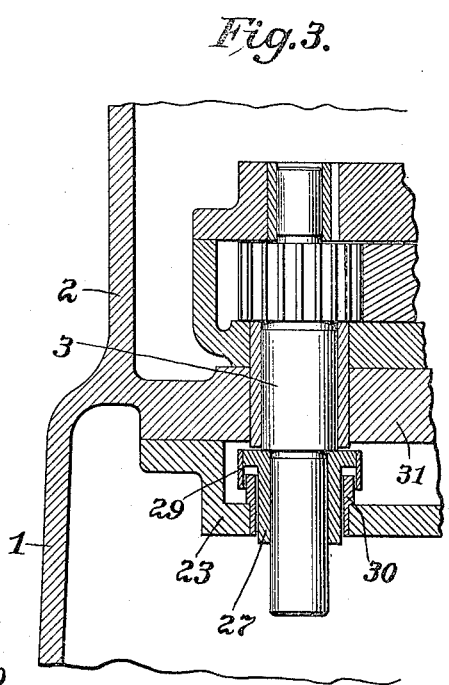
Fig. 3 is a detail view of parts shown in Fig. 1.

The machine includes a head 1 carrying a gear chest 2 with spindles 3 connected with flexible shafting 4 by which the drills are driven. The gearing within the gear chest is driven by a shaft 5 which in turn is driven by gearing in a box 6 at the top of the column 7.

The force feed lubricating system includes the pump 8 which takes oil from tank 9 and forces it up through pipe 10 where it connects with a perforated pipe 11 which delivers the oil into the gear box 6, and from here the oil drains back to the tank through pipe 12. The perforated pipe has an extension 11ª through which the oil passes to the front portion of the gear box to lubricate the gearing here. I make provision for conveying oil from the gear box 6 to the gear chest 2 and thence back to the tank 9.

The means that I employ for this purpose not only provides for the oiling of the bearings of the shaft 5 in a positive manner and oils the gearing and bearings in the gear chest, but prevents oil from being thrown off from the shaft 5 upon the surrounding parts of the apparatus and the room in which the apparatus is located, and the workmen attending the machine.

From the gear box 6 the oil passes down through the ports or passages 13, into a sleeve 15, which conducts the oil to ports 14 of the gear chest through which it enters the latter. This sleeve surrounds the shaft 5 and is of telescopic form so that the connection will be maintained and the shaft will be enclosed at all times despite the fact that the head 1 with its gear chest is moved to different positions vertically along the column, in carrying out the drilling operations. This sleeve is composed of sections, the innermost one 18 of which is flared outwardly at its upper end to fit the bevelled seat 16 formed in the collar 17, attached to the underside of the gear box 6. The lower end of this innermost section of the sleeve is flared outwardly. The next section is tapered at its upper end and flared at its lower end, and this construction is followed out in connection with the other sections excepting the outer section 19 which is turned inwardly at its upper end but is left straight at its lower end and this end is held by screws 20 within the collar 21 fixed to the upper wall or cover of the gear chest 2. By this construction the sleeve sections are spaced apart throughout their lengths excepting at their extreme upper and lower edges, and this spacing prevents creeping of the oil by capillary attraction so that the outer side of the sleeve will be kept free from oil, despite the fact that the sections have movement one upon the other due to the rise and fall of the head with the gear chest. By my construction I convert what has heretofore been objectionable, i. e., the running down of oil onto shaft 5 into an advantage for instead of this oil being thrown off upon the surrounding parts of the machine or shop, I cause this oil to be directed so as to form a part of the circulating oil circuit, and lubricate the gear chest, and for this purpose the definite provisions for conducting the oil to and from the space within the telescoping sleeve are provided consisting of the ports or passages 13 and 14. From the gear chest the oil will pass through the bearings of the gearing into the pan 23 and thence by pipe 24 into the tube or stand pipe 25 with which the pipe 24 telescopes and from here back to the tank.

If the oil accumulates too rapidly in the gear chest it will overflow the pipe 26 and get into the pan and be led back to the tank as just described.

In order to prevent the oil from running down the spindles to a point below the gear chest and getting on the flexible shafting and being spread around, I provide the deflecting sleeve 27 which is pressed tightly on the lower part of the spindle to rotate therewith. This sleeve has an overhanging flange 29, which extends down outside the deflecting bushing or collar 30. This collar is mounted in the bottom of the catch pan 23 and extends upwardly therefrom. This construction will prevent the escape of oil onto the depending end of the spindle and onto the flexible shafting.

This construction also facilitates ready assembly of the parts, because the sleeve and bushing are arranged below the bottom 31 of the gear chest. In assembling, the spindle pinions are all placed in position. The deflecting sleeve is also placed in position on the spindle and being closely fitted thereto, it will be held thereon against dropping down. The bushing is placed in the pan and then the pan is placed in position by moving it up along the depending ends of the spindles and it is then secured in place. The deflecting sleeve being secured to the spindle, will revolve therewith.

The construction described enables forced lubrication to be employed without having the oil thrown off from the machine as the oil is prevented from getting on any exposed revolving parts.

If the center shaft is prolonged below the gear chest it would be provided with the sleeve and bushing arrangement above described.

I claim:—

1. In combination in a drilling machine, a column, a head movable along the column vertically and having a gear chest, a gear box at the top of the column, a vertical shaft driven from means in the gear box and extending down into the gear chest to drive gearing therein, means for supplying oil to the gear box, a sleeve made up of telescoping members enclosing the said vertical shaft, the upper one of said members being connected with the gear box and the lower member with the gear chest to direct oil from the gear box to the gear chest, and prevent it from being thrown off upon the surroundings by the revolution of said shaft, substantially as described.

2. In combination in a drilling machine, a column, a head movable along the column vertically and having a gear chest, a gear box at the top of the column, a vertical shaft driven from means in the gear box and extending down into the gear chest to drive gearing therein, means for supplying oil to the gear box, a sleeve made up of telescoping members enclosing the said vertical shaft, the upper one of said members being connected with the gear box and the lower member with the gear chest to direct oil from the gear box to the gear chest and prevent it from being thrown off upon the surroundings by the revolution of said shaft, a port leading from the gear box to the upper end of said sleeve and a port leading to the gear chest from the lower end of said sleeve, substantially as described.

3. In combination in a drilling machine, a column, a head movable along the column vertically and having a gear chest, a gear box at the top of the column, a vertical shaft driven from means in the gear box and extending down into the gear chest to drive gearing therein, means for supplying oil to the gear box, a sleeve made up of telescoping members enclosing the said vertical shaft, the upper one of said members being connected with the gear box and the lower member with the gear chest to direct oil from the gear box to the gear chest and prevent it from being thrown off upon the surroundings by the revolution of said shaft, said members being spaced apart throughout their major portions of their length and in close contact at their ends, substantially as described.

4. In combination in a drilling machine, a column, a head movable along the column vertically and having a gear chest, a gear box at the top of the column, a vertical shaft driven from means in the gear box and extending down into the gear chest to drive gearing therein, means for supplying oil to the gear box, a sleeve made up of telescoping members enclosing the said vertical shaft, the upper one of said members being connected with the gear box and the lower member with the gear chest to direct oil from the gear box to the gear chest, and prevent it from being thrown off upon the surroundings by the revolution of said shaft, the end of one member where it contacts with the other being bent laterally to form a close joint therewith.

5. In combination in a drilling machine, a column, a head movable along the column vertically and having a gear chest, a gear box at the top of the column, a vertical shaft driven from means in the gear box and extending down into the gear chest to drive gearing therein, means for supplying oil to the gear box, a sleeve made up of telescoping members enclosing the said vertical shaft, the upper one of said members being connected with the gear box and the lower member with the gear chest to direct oil from the gear box to the gear chest and prevent it from being thrown off upon the surroundings by the revolution of said shaft, said sleeve also including an intermediate member or members having the upper end thereof turned inwardly and the lower end turned outwardly to bear closely upon the adjacent member.

6. In combination in a drilling machine, a column, a drill carrying head mounted thereon, a vertical shaft for operating the drills, a gear chest carried by the head the gears of which are driven by said shaft, a gear box having means for driving the shaft, means for supplying oil to the gear box, and a telescopic sleeve surrounding the vertical drive shaft and enclosing the shaft to direct oil from the gear box to the gear chest.

7. In combination in a drill press, a gear chest, spindles mounted therein, a pan removably secured to the under side of the gear chest, a sleeve secured to the spindle below the bottom of the gear chest and within the pan, and a collar secured to the pan about the spindle where it passes through the bottom of the pan, said sleeve having a portion overhanging the collar, substantially as described.

8. In combination with a gear chest of a drilling machine, a pan removably secured to the lower side thereof, a shaft extending from the gear chest through the pan, a sleeve fixed on the shaft and having an overhanging portion within the pan, and a bushing fixed in the pan surrounding the shaft and extending up from the bottom of the pan beneath the overhang of the sleeve, means for feeding oil into the gear chest and means for delivering oil from the pan, substantially as described.

9. In a drill press the combination of a vertical spindle or spindles, gearing for operating the same, a chest enclosing said gearing, means for lubricating said spindle, means for collecting the oil passing through the lowermost bearing of said spindle, to prevent the oil from being thrown about the machine, said spindle passing through and below the said collecting means, and a drill shaft connected with the lower end of the spindle, substantially as described.

10. In a drill press, the combination of a vertical spindle or spindles, gearing for operating the same, a chest enclosing said gearing and having a lowermost bearing for the spindle, means for lubricating said spindle, means for collecting oil passing through the lowermost bearing, said means including a chamber surrounding the spindle below the said bearing, and an oil deflecting device surrounding the spindle for directing the oil passing along the spindle and below said bearing into the said chamber, to prevent it from passing to the lower end of the spindle, and from being thrown around the machine.

11. In combination in a drill press, having a vertical spindle with gearing for driving the same, a chest for enclosing said gearing having a bearing for the spindle, a detachable member below the said bearing to collect the lubricant passing therethrough, said detachable collecting member having an upwardly extending bushing to receive the spindle when the said detachable member is set in place against the casing, and said spindle having a deflecting collar pressed thereon below the spindle bearing and overhanging the bushing, means for conducting the oil away from said collecting means, and a drill shaft connected with the lower end of the spindle.

12. In a machine having a gear chest having vertical movement carrying a vertical spindle, or spindles, means for feeding lubricant to said spindle and means for conducting said lubricant from said spindle, consisting of a telescoping pipe, one part carried by the chest, or head, and the other attached to the oil tank, or base of machine.

In testimony whereof I affix my signature.

WILLIAM R. FOX.